US012612031B2

(12) United States Patent
Walsh et al.

(10) Patent No.: US 12,612,031 B2
(45) Date of Patent: Apr. 28, 2026

(54) OPTIMAL ELECTRIC MOTOR TORQUE ACTUATION IN HYBRID AND ELECTRIC PROPULSION SYSTEMS AT LOW TORQUE REQUESTS

(71) Applicant: FCA US LLC, Auburn Hills, MI (US)

(72) Inventors: McKenzie Walsh, Auburn Hills, MI (US); Gokul Maharaj Badrinath, Rochester Hills, MI (US); Andryas Mawardi, Rochester, MI (US); Nadirsh Patel, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 172 days.

(21) Appl. No.: 18/525,983

(22) Filed: Dec. 1, 2023

(65) Prior Publication Data

US 2025/0178587 A1      Jun. 5, 2025

(51) Int. Cl.
*B60W 20/15* (2016.01)
*B60W 10/08* (2006.01)
*B60W 20/11* (2016.01)

(52) U.S. Cl.
CPC ............ *B60W 20/15* (2016.01); *B60W 10/08* (2013.01); *B60W 20/11* (2016.01); *B60W 2710/083* (2013.01)

(58) Field of Classification Search
CPC ...... B60W 20/15; B60W 10/08; B60W 20/11; B60W 2710/083
See application file for complete search history.

(56) References Cited

U.S. PATENT DOCUMENTS

| | | | |
|---|---|---|---|
| 7,154,236 | B1 | 12/2006 | Heap |
| 8,285,462 | B2 | 10/2012 | Heap et al. |
| 9,242,640 | B2 | 1/2016 | Tagawa et al. |
| 2015/0298574 | A1* | 10/2015 | Bramson ............. B60L 15/2054 |
| | | | 701/22 |
| 2018/0086343 | A1* | 3/2018 | Crain .................... B60W 30/18 |

FOREIGN PATENT DOCUMENTS

| CN | 2850996 Y | 12/2006 |
|---|---|---|
| CN | 110605960 A | 12/2019 |

* cited by examiner

*Primary Examiner* — Brian P Sweeney
(74) *Attorney, Agent, or Firm* — Jeremy J. Klobucar

(57) ABSTRACT

An optimized control system for a multi-motor propulsion system of an electrified vehicle is configured to access a calibrated surface that defines operating points corresponding to different torque requests and for enabling/disabling first and second electric traction motors of an electrified powertrain, determine an operating mode for the electrified powertrain based on the torque request and the calibrated surface, wherein the operating mode is one of (i) enabling the first electric traction motor and disabling the second electric traction motor, (ii) enabling the second electric traction motor and disabling the first electric traction motor, and (iii) enabling both the first and second electric traction motors, and control the electrified powertrain according to the determined operating mode such that the one or more enabled electric traction motors satisfies the torque request and thereby improves an efficiency of the electrified powertrain.

14 Claims, 4 Drawing Sheets

OPTIMAL ELECTRIC MOTOR TORQUE ACTUATION IN HYBRID AND ELECTRIC PROPULSION SYSTEMS AT LOW TORQUE REQUESTS

FIELD

The present application generally relates to electrified vehicle propulsion systems and, more particularly, to optimal control techniques for an electrified vehicle propulsion system having at least two electric traction motors.

BACKGROUND

One type of propulsion system for an electrified vehicle (e.g., a battery electric vehicle, or BEV) includes two electric traction motors. For example only, each half shaft or axle of the electrified vehicle could be associated with a different electric traction motor. Conventional control systems for these multi-motor propulsion systems operate both electric motors to generate propulsive torque continuously (i.e., at all times) and adjust their optimal torque split therebetween. One well-known optimal torque split calculation is known as the "donut space" method, in which a quadratic fit for a given speed as a function of commanded motor is used and the optimization regions appear donut-shaped on a graph/plot. Requiring both of these electric motors to always be running/operating (i.e., continuous operation) results in potential power losses and system inefficiency. Accordingly, while such conventional multi-motor propulsion system control techniques do work for their intended purpose, there exists an opportunity for improvement in the relevant art.

SUMMARY

According to one example aspect of the invention, an optimized control system for a multi-motor propulsion system of an electrified vehicle is presented. In one exemplary implementation, the optimized control system comprises a set of sensors configured to determine a torque request for an electrified powertrain of the electrified vehicle, the electrified powertrain including at least first and second electric traction motors and a control system configured to access a calibrated surface that defines operating points corresponding to different torque requests and for enabling/disabling the first and second electric traction motors of the electrified powertrain, determine an operating mode for the electrified powertrain based on the torque request and the calibrated surface, wherein the operating mode is one of (i) enabling the first electric traction motor and disabling the second electric traction motor, (ii) enabling the second electric traction motor and disabling the first electric traction motor, and (iii) enabling both the first and second electric traction motors, and control the electrified powertrain according to the determined operating mode such that the one or more enabled electric traction motors satisfies the torque request and thereby improves an efficiency of the electrified powertrain compared to continuously operating both the first and second electric traction motors at all times during operation of the electrified powertrain.

In some implementations, the operating points include first, second, and third operating points that collectively define first, second, third, and fourth ranges of torque requests that are distinct and non-overlapping. In some implementations, the first range is less a first operating point and the second range is greater than the second operating point, and wherein the first and second ranges correspond to enabling both the first and second electric traction motors and controlling an optimized torque split therebetween. In some implementations, the third operating range is between the first and third operating points and the fourth range is between the third and second operating points, wherein the third range corresponds to enabling only the first electric traction motor, and wherein the fourth range corresponds to enabling only the second electric traction motor.

In some implementations, the calibrated surface minimizes power consumption of a battery system of the electrified vehicle by the first and second electric traction motors. In some implementations, the calibrated surface is predetermined based on empirical testing data for the electrified vehicle. In some implementations, the calibrated surface is a look-up table or plot. In some implementations, the first electric traction motor is associated with a first half shaft or axle of the electrified vehicle and the second electric traction motor is associated with a different second half shaft or axle of the electrified vehicle. In some implementations, the electrified powertrain further includes an internal combustion engine.

According to another example aspect of the invention, an optimized control method for a multi-motor propulsion system of an electrified vehicle is presented. In one exemplary implementation, the optimized control method comprises determining, by a control system and using a set of sensors of the electrified vehicle, determine a torque request for an electrified powertrain of the electrified vehicle, the electrified powertrain including at least first and second electric traction motors, accessing, by the control system, a calibrated surface that defines operating points corresponding to different torque requests and for enabling/disabling the first and second electric traction motors of the electrified powertrain, determining, by the control system, an operating mode for the electrified powertrain based on the torque request and the calibrated surface, wherein the operating mode is one of (i) enabling the first electric traction motor and disabling the second electric traction motor, (ii) enabling the second electric traction motor and disabling the first electric traction motor, and (iii) enabling both the first and second electric traction motors, and controlling, by the control system the electrified powertrain according to the determined operating mode such that the one or more enabled electric traction motors satisfies the torque request and thereby improves an efficiency of the electrified powertrain compared to continuously operating both the first and second electric traction motors at all times during operation of the electrified powertrain.

In some implementations, the operating points include first, second, and third operating points that collectively define first, second, third, and fourth ranges of torque requests that are distinct and non-overlapping. In some implementations, the first range is less a first operating point and the second range is greater than the second operating point, and wherein the first and second ranges correspond to enabling both the first and second electric traction motors and controlling an optimized torque split therebetween. In some implementations, the third operating range is between the first and third operating points and the fourth range is between the third and second operating points, wherein the third range corresponds to enabling only the first electric traction motor, and wherein the fourth range corresponds to enabling only the second electric traction motor.

In some implementations, the calibrated surface minimizes power consumption of a battery system of the electrified vehicle by the first and second electric traction motors. In some implementations, the calibrated surface is predetermined based on empirical testing data for the electrified vehicle. In some implementations, the calibrated surface is a look-up table or plot. In some implementations, the first electric traction motor is associated with a first half shaft or axle of the electrified vehicle and the second electric traction motor is associated with a different second half shaft or axle of the electrified vehicle. In some implementations, the electrified powertrain further includes an internal combustion engine.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, many electrified vehicles include multi-motor propulsion systems, i.e., electrified powertrains including at least two electric traction motors. One well-known optimal torque split calculation is known as the "donut space" method, in which a quadratic fit for a given speed as a function of commanded motor is used and the optimization regions appear donut-shaped on a graph/plot. Requiring both of these electric motors to always be running/operating (i.e., continuous operation) results in potential power losses and system inefficiency. For example, six-switch motor control could include an inverter actively switching even though the respective electric traction motor is outputting zero torque. Accordingly, improved control techniques that minimize electrified vehicle battery power consumption, subject to a set of constraints and for fixed speeds, based on the driver torque request. The result is a calibrated surface (e.g., a look-up table or plot) that specifies different points ("A," "B," and "O" points) that define ranges relative thereto including a range where only one electric motor ("Motor A") should be running/powered up (with the other electric motor—"Motor B"—being temporarily disabled/powered down) and vice-versa (a range for the opposite operation), and also ranges where both motors (Motors A and B) should be running/powered up with an optimal torque split being controlled therebetween. Potential benefits could include decreased power losses and increased efficiency.

Figure 1A:
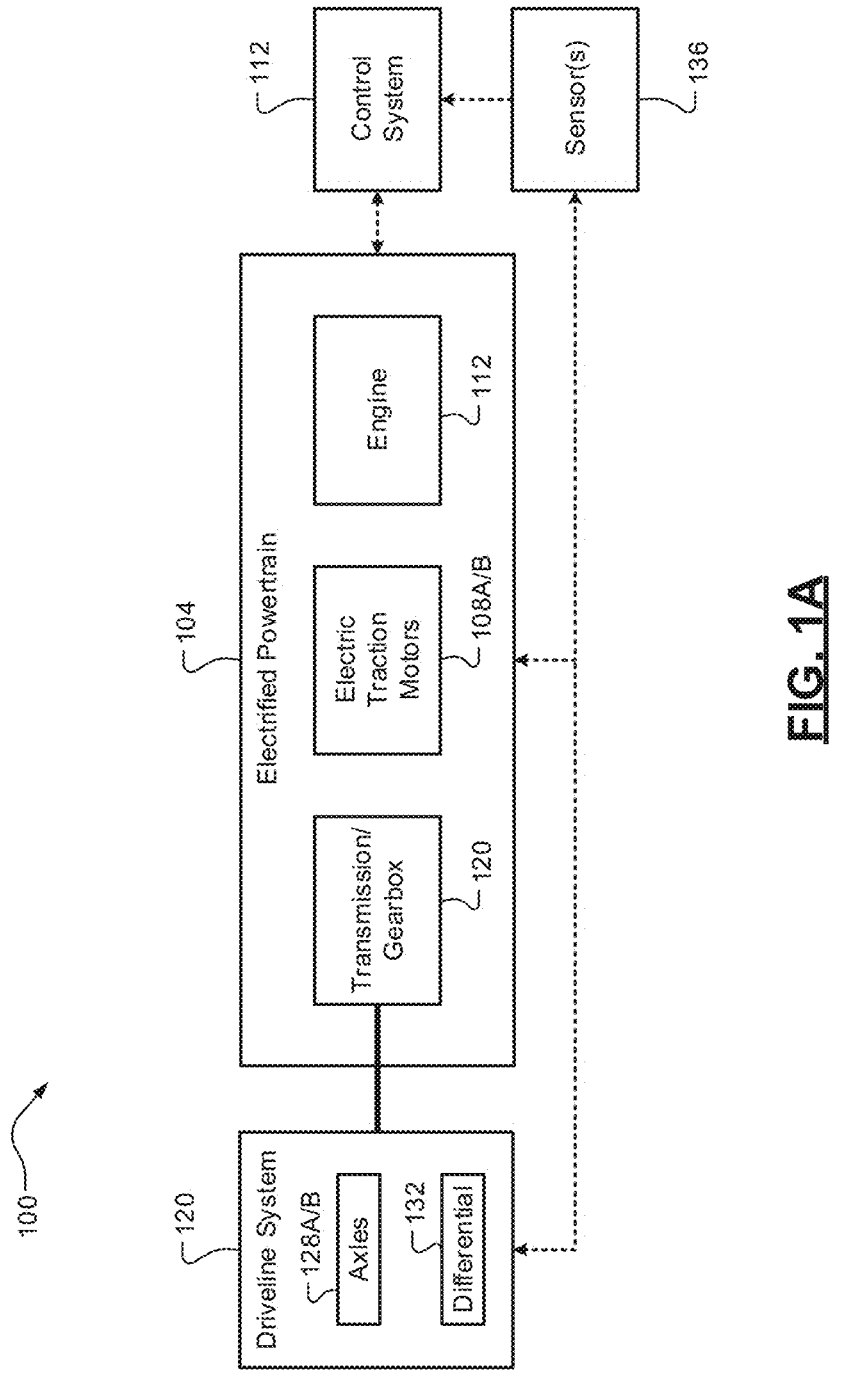
FIGS. 1A-1B are functional block and system diagrams of an example multi-motor propulsion system of an electrified vehicle according to the principles of the present application.

Referring now to FIG. 1A, a functional block diagram of an electrified vehicle 100 having an example multi-motor propulsion system 104 according to the principles of the present application is illustrated. The multi-motor propulsion system 104 can also be referred to as an electrified powertrain 104 that includes at least two electric traction motors 108A, 108B and a corresponding controller or control system 112. In some implementations, the electrified vehicle 100 is a battery electric vehicle (BEV) and the electrified powertrain 104 only includes the electric traction motors 108A, 108B (collectively, "electric traction motors 108") powered by electrical current from one or more high voltage battery systems or packs (not shown). In other implementations, the electrified vehicle 100 is a hybrid electric vehicle (HEV) and the electrified powertrain 104 includes an internal combustion engine 116, but it will be appreciated the engine 116 is merely optional. The electrified powertrain 104 and the control system 112 are collectively referred to herein as a multi-motor propulsion system or electrified powertrain system of the electrified vehicle 100. The electrified powertrain 104 is configured to generate drive torque and transfer the drive torque, via an automatic transmission 120 or other suitable transmission system, to a driveline system 124 of the electrified vehicle 100. The driveline 124 includes any suitable driveline components, such as half shafts or axles 128A, 128B (collectively, "axles 128") and a differential 132. The control system 112 is configured to receive information from a set of one or more sensors 136, which could include a driver interface (not shown), such as an accelerator pedal, that is manipulated by a driver to provide a torque request.

Figure 1B:
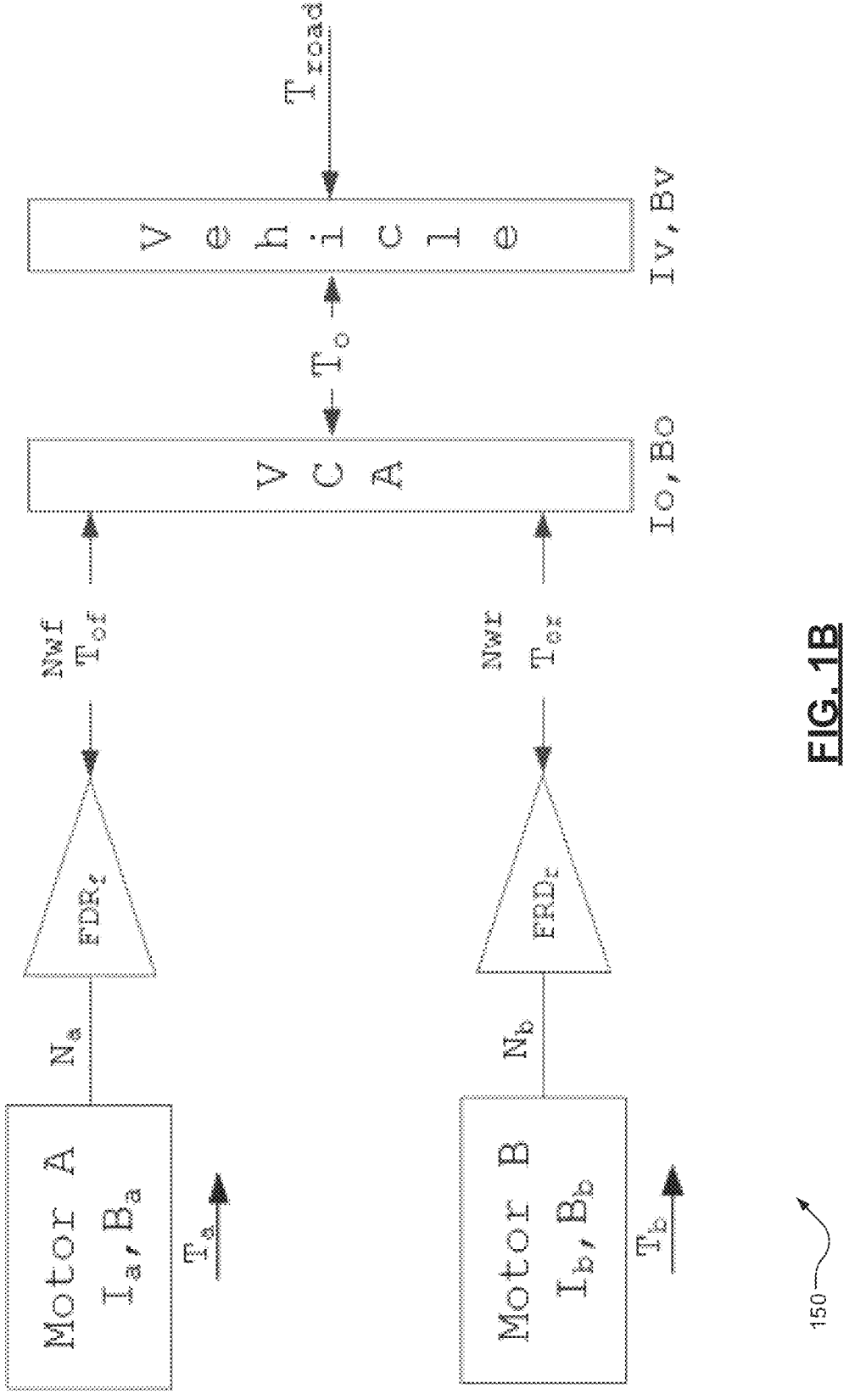

Referring now to FIG. 1B and with continued reference to FIG. 1A, an example system diagram 150 representing the electrified powertrain 104 according to the principles of the present application is illustrated. For an electrified powertrain 104 with two electric traction motors 108A, 108B, one electric traction motor located on or connectable to each axle 128A, 128B with final drive ratios (front final drive ratio=FDR$_F$, and rear final drive ratio=FDR$_R$), the dynamic equation of motion for propulsion system output torque, "T$_o$", is shown below in Equation (1) where Ta represents electric traction motor 108A (Motor A's) torque, Tb represents electric traction motor 108B (Motor B's) torque, and C is a constant term representing mechanical losses of the driveline system 124.

$$T_o = FDR_F * Ta + FDR_R * Tb + C_{T_o} \qquad (1)$$

where T$_{oF}$ represents the front axle's torque and T$_{OR}$ represents the rear axle torque. The dynamic equations for axle torque are shown below in Equations (2) and (3):

$$T_{oF} = FDR_F * Ta + C_{ToF} \qquad (2)$$

$$T_{oR} = FDR_R * Tb + C_{ToR}. \qquad (3)$$

In certain situations, the most energy efficient operating mode for the electrified powertrain 104 is to disable one of the two electric traction motors 108A or 108B and deliver the entirety of the driver requested torque with the other remaining enabled electric traction motor 108A or 108B. As previously mentioned, conventional inverter switching control could continue occurring even though the respective motor is outputting zero torque, which could result in power dissipation or losses of hundreds of watts.

Such operating points can be determined by minimizing battery power (in kilowatts, or kW) as shown in the Equations below, subject to electric motor torque minimum and maximum inequality constraints and output torque equality constraint. As part of the techniques of the present application, the battery power $P_{Battery}$ in Equation (4a) below is thereby minimized subject to the Constraint Inequalities (4b) below:

$$P_{Battery} = f(Na, Nb, Ta, Tb) = P_{Mechanical} + P_{Electrical}, \quad (4a)$$

subject to:

$$\text{constraints: } \begin{cases} Ta_{Min} \le Ta \le Ta_{Max} \\ Tb_{Min} \le Tb \le Tb_{Max} \\ T_{o,Demand} = FDR_F * Ta + FDR_R * Tb + C_{To} \end{cases}, \quad (4b)$$

where:

$$P_{Mechanical} = P_{Mechanical,A} + P_{Mechanical,B} = \frac{Na*Ta}{9549.297} + \frac{Nb*Tb}{9549.297}, \text{ and} \quad (5)$$

$$P_{Electrical} = P_{Electrical,A} + P_{Electrical,B}, \quad (6)$$

where $P_{Electrical,A}$ and $P_{Electrical,B}$ in Equation (6) above are determined from empirical electric traction motor loss maps. For fixed speeds, the above-described optimization problem of Equation (4a) yields results shown in a calibrated surface, such as the look-up table or plot as further described below. The calibrated surface could be, for example, a function of motor shaft speeds and output shaft speeds, which could be measured by the sensor(s) 136 along with any other desired operating parameters (e.g., powertrain/driveline shaft speeds).

Figure 2:
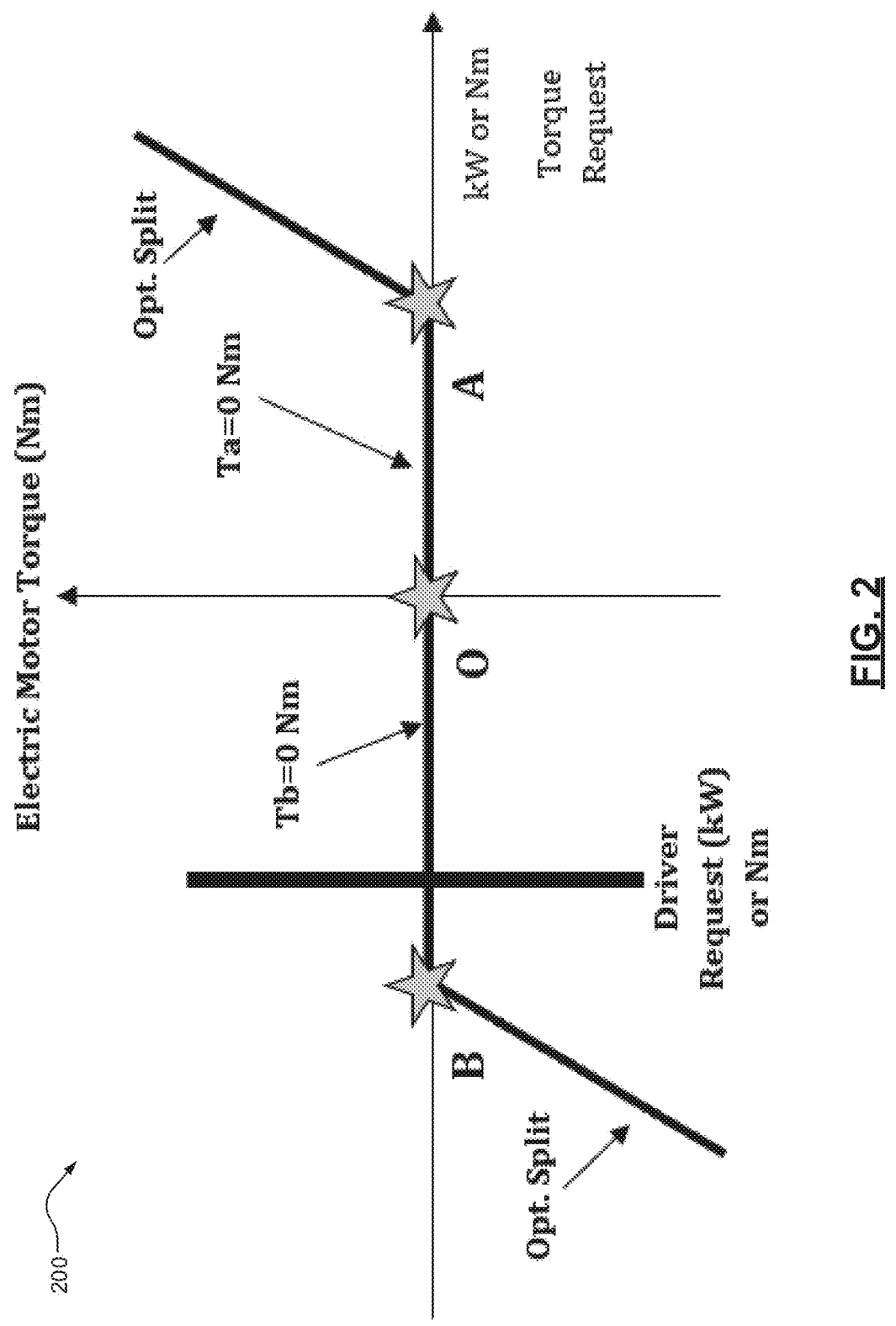
FIG. 2 is an example plot illustrating optimal single and dual/two electric traction motor operating regions for various torque/power requests according to the principles of the present application.

Referring now to FIG. 2 and with continued reference to FIGS. 1A-1B, an example plot 200 illustrating optimal single electric traction motor and dual/two electric traction motor operating regions based on a torque/power request (i.e., torque or power domains) according to the principles of the present application. This example plot 200 is also referred to herein as a "calibrated surface" as it represents an empirically-based two-dimensional (2D) relationship (i.e., a 2D surface) between torque request and the enabled/disabled states of electric traction motors 108A, 108B. As shown, three specific operating points—A, B, and O—are identified. These ABO operating points collectively define four ranges corresponding to different operating modes of the electrified powertrain 104, i.e., Motor A only, Motor B only, or Motors A and B. As shown, these four ranges are distinct and non-overlapping. A first range corresponds to torque requests less than operating point A and a second range corresponds to torque requests greater than operating point B. These end ranges correspond to enabling both electric traction motors 108A, 108B and optimizing a torque split therebetween. In a central or middle area of the plot 200, third and fourth ranges are shown with the third range being defined between operating points A and O and the fourth range being defined between operating points O and B. In the third range (A-O), only electric traction motor 108A is enabled (and electric traction motor 108B is disabled). Conversely, in the fourth range (O-B), only electric traction motor 108B is enabled (and electric traction motor 108A is disabled).

Figure 3:
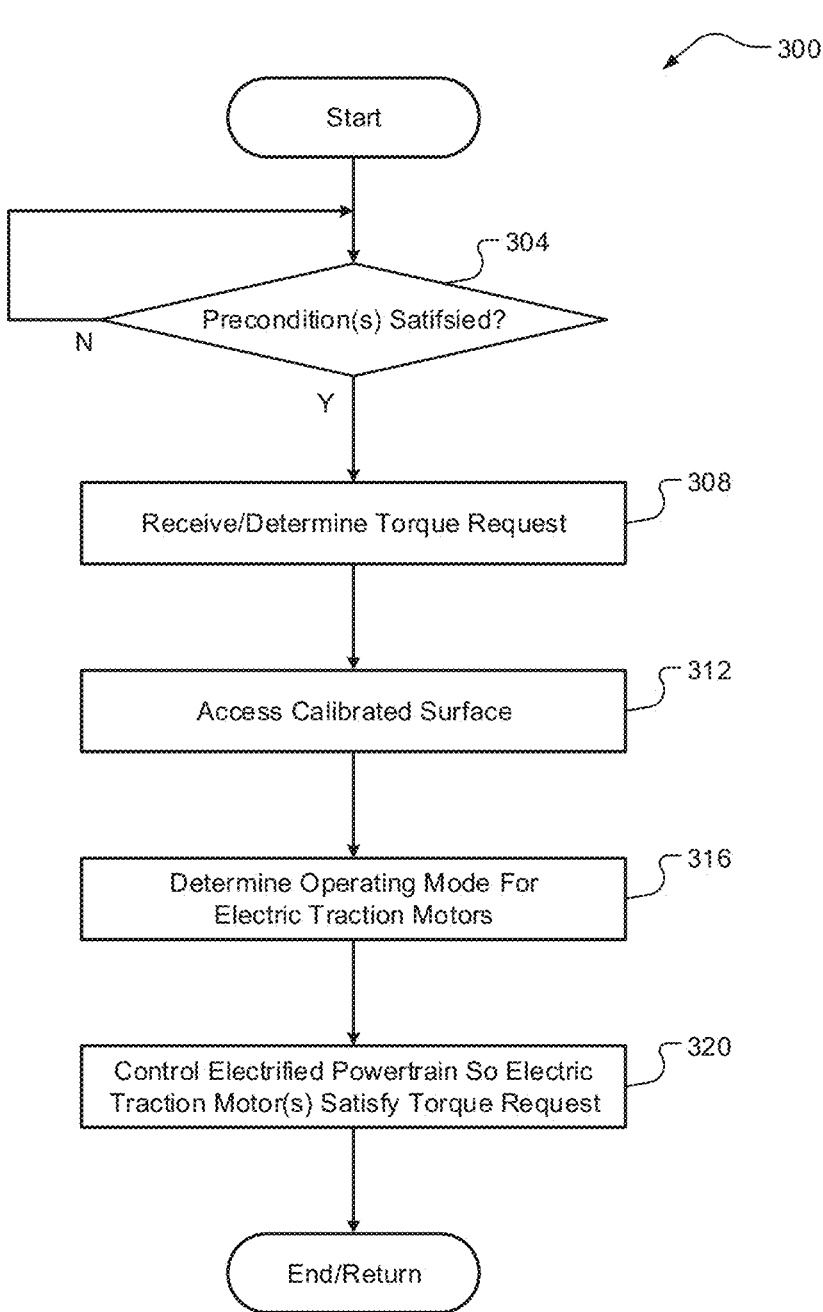
FIG. 3 is a flow diagram of an example optimized control method for multi-motor propulsion system of an electrified vehicle according to the principles of the present application.

Referring now to FIG. 3, a flow diagram of an example optimized control method 300 for multi-motor propulsion system of an electrified vehicle according to the principles of the present application is illustrated. While the electrified vehicle 100 and its electrified powertrain 104 and other components are specifically referenced for illustrative/descriptive purposes, it will be appreciated that this method 300 could be appliable to any suitably configured vehicle multi-motor powertrain. At 304, the control system 104 determines whether an optional set of one or more preconditions is satisfied. This could include, for example only, the electrified vehicle 100 being powered up and in a drive-ready state with an acceptable torque request and there being no malfunctions or faults present that would otherwise inhibit or negatively impact the operation of the techniques of the present application. When false, the method 300 ends or returns to 304. When true, the method 300 proceeds to 308.

At 308, the control system 112 determines a torque request for the electrified powertrain 104. This torque request could be determined, for example, based on driver input (e.g., accelerator pedal manipulation) as measured by the sensor(s) 136. In some implementations, this method 300 is limited to situations when the torque request is relatively low, such as below a threshold level such that torque request satisfaction via only one of the two electric traction motors 112A/B is possible. At 312, the control system 112 accesses the calibrated surface (e.g., plot 200). At 316, based on the torque request and the accessed calibrated surface, the control system 112 determines an operating mode for the electric traction motors 108A, 108B (e.g., only one enabled and the other disabled, or both enabled). At 320, the control system 112 controls the electrified powertrain 104 such that the enabled electric traction motor(s) 112A and/or 112B satisfy the torque request. This could include, for example, both electric traction motors 112A/B being enabled and optimizing a torque split therebetween. This improved control of the electrified powertrain 104 could potentially result in mitigated/reduced or eliminated torque losses and an increased operating efficiency. The method 300 then ends or returns to 304.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An optimized control system for a multi-motor propulsion system of an electrified vehicle, the optimized control system comprising:

a set of sensors of the electrified vehicle, the set of sensors being configured to measure a set of operating parameters of an electrified powertrain of the electrified vehicle, the electrified powertrain including at least first and second electric traction motors; and a control system of the electrified vehicle, the control system being configured to control operation of the electrified vehicle, including:

determining, based on the set of operating parameters as measured by the set of sensors, a torque request for the electrified powertrain;

accessing a calibrated surface that defines operating points corresponding to different torque requests and for enabling/disabling the first and second electric traction motors of the electrified powertrain;

determining an operating mode for the electrified powertrain based on the torque request and the calibrated surface, wherein the operating mode is one of (i) enabling the first electric traction motor and disabling the second electric traction motor, (ii) enabling the second electric traction motor and disabling the first electric traction motor, and (iii) enabling both the first and second electric traction motors; and controlling the electrified powertrain according to the determined operating mode such that the one or more enabled electric traction motors satisfies the torque request and thereby improves an efficiency of the electrified powertrain compared to continuously operating both the first and second electric traction motors at all times during operation of the electrified powertrain, wherein the operating points include first, second, and third operating points that collectively define first, second, third, and fourth ranges of torque requests that are distinct and non-overlapping, and wherein the first range is less a first operating point and the second range is greater than the second operating point, and wherein the first and second ranges correspond to enabling both the first and second electric traction motors and controlling an optimized torque split therebetween.

2. The optimized control system of claim 1, wherein the third operating range is between the first and third operating points and the fourth range is between the third and second operating points, wherein the third range corresponds to enabling only the first electric traction motor, and wherein the fourth range corresponds to enabling only the second electric traction motor.

3. The optimized control system of claim 1, wherein the calibrated surface minimizes power consumption of a battery system of the electrified vehicle by the first and second electric traction motors.

4. The optimized control system of claim 1, wherein the calibrated surface is predetermined based on empirical testing data for the electrified vehicle.

5. The optimized control system of claim 4, wherein the calibrated surface is a look-up table or plot.

6. The optimized control system of claim 1, wherein the first electric traction motor is associated with a first half shaft or axle of the electrified vehicle and the second electric traction motor is associated with a different second half shaft or axle of the electrified vehicle.

7. The optimized control system of claim 1, wherein the electrified powertrain further includes an internal combustion engine.

8. An optimized control method for a multi-motor propulsion system of an electrified vehicle, the optimized control method comprising:

determining, by a control system and using a set of sensors of the electrified vehicle, determine a torque request for an electrified powertrain of the electrified vehicle, the electrified powertrain including at least first and second electric traction motors;

accessing, by the control system, a calibrated surface that defines operating points corresponding to different torque requests and for enabling/disabling the first and second electric traction motors of the electrified powertrain;

determining, by the control system, an operating mode for the electrified powertrain based on the torque request and the calibrated surface, wherein the operating mode is one of (i) enabling the first electric traction motor and disabling the second electric traction motor, (ii) enabling the second electric traction motor and disabling the first electric traction motor, and (iii) enabling both the first and second electric traction motors; and controlling, by the control system the electrified powertrain according to the determined operating mode such that the one or more enabled electric traction motors satisfies the torque request and thereby improves an efficiency of the electrified powertrain compared to continuously operating both the first and second electric traction motors at all times during operation of the electrified powertrain, wherein the operating points include first, second, and third operating points that collectively define first, second, third, and fourth ranges of torque requests that are distinct and non-overlapping, and wherein the first range is less a first operating point and the second range is greater than the second operating point, and wherein the first and second ranges correspond to enabling both the first and second electric traction motors and controlling an optimized torque split therebetween.

9. The optimized control method of claim 8, wherein the third operating range is between the first and third operating points and the fourth range is between the third and second operating points, wherein the third range corresponds to enabling only the first electric traction motor, and wherein the fourth range corresponds to enabling only the second electric traction motor.

10. The optimized control method of claim 8, wherein the calibrated surface minimizes power consumption of a battery system of the electrified vehicle by the first and second electric traction motors.

11. The optimized control method of claim 8, wherein the calibrated surface is predetermined based on empirical testing data for the electrified vehicle.

12. The optimized control method of claim 11, wherein the calibrated surface is a look-up table or plot.

13. The optimized control method of claim 8, wherein the first electric traction motor is associated with a first half shaft or axle of the electrified vehicle and the second electric traction motor is associated with a different second half shaft or axle of the electrified vehicle.

14. The optimized control method of claim 8, wherein the electrified powertrain further includes an internal combustion engine.

* * * * *